(12) United States Patent
Iwamura

(10) Patent No.: US 6,560,339 B1
(45) Date of Patent: May 6, 2003

(54) ELECTRONIC WATERMARKING METHOD, DIGITAL INFORMATION DISTRIBUTION SYSTEM USING SUCH METHOD, AND STORAGE MEDIUM STORING PROGRAM OF SUCH METHOD

(75) Inventor: Keiichi Iwamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/248,975

(22) Filed: Feb. 12, 1999

(30) Foreign Application Priority Data

Feb. 17, 1998 (JP) .......................................... 10-034770

(51) Int. Cl.[7] ............................................. H04N 7/167
(52) U.S. Cl. ........................ 380/201; 380/239; 380/44; 380/282; 713/176; 705/51; 382/250; 382/283
(58) Field of Search ................................ 380/201, 239, 380/44, 282; 705/51, 57; 713/176; 382/250, 283

(56) References Cited

U.S. PATENT DOCUMENTS

| | | | |
|---|---|---|---|
| 5,600,720 A | 2/1997 | Iwamura et al. ................ 380/1 |
| 5,666,419 A | 9/1997 | Yamamoto et al. ............ 380/28 |
| 6,141,753 A | * 10/2000 | Zhao et al. .................. 713/176 |
| 6,330,672 B1 | * 12/2001 | Shur ........................... 713/176 |
| 6,385,329 B1 | * 5/2002 | Sharma et al. ............... 382/100 |
| 6,385,596 B1 | * 5/2002 | Wiser et al. .................... 705/51 |

OTHER PUBLICATIONS

"Handbook of Applied Cryptography," Menezes, van Oorshot, Vanstone, pp. 559–560, C.R.C. Press L.L.P. 1997.*

* cited by examiner

*Primary Examiner*—Matthew Smithers
*Assistant Examiner*—Paul Callahan
(74) *Attorney, Agent, or Firm*—Fitzpatrick, Cella, Harper & Scinto

(57) ABSTRACT

An electronic watermarking method includes the steps of generating a plurality piece of information with different electronic watermark information, generating a plurality piece of encrypted information through encryption of the plurality piece of information with each independent encryption key, generating a plurality of encrypted encryption keys through encryption of each independent encryption key with each different encryption key, transmitting the plurality piece of encrypted information and the plurality of encrypted encryption keys to a user, the first to fourth steps being executed by a server, and selecting each pair of a piece of the plurality of encrypted information and a corresponding encrypted encryption key, the fifth step being executed by the user, wherein only some of the encryption keys are multiplied by random numbers.

11 Claims, 6 Drawing Sheets

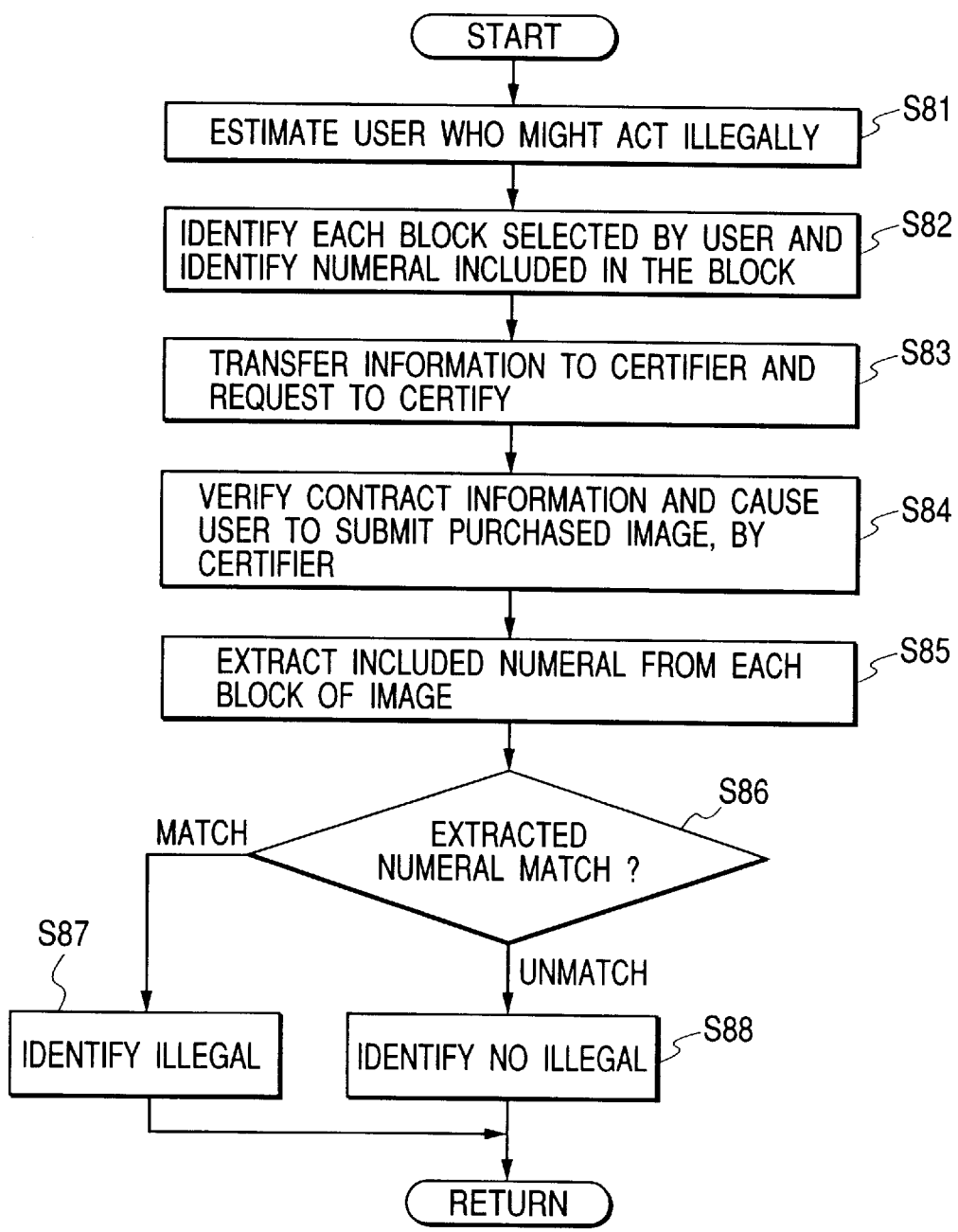

ELECTRONIC WATERMARKING METHOD, DIGITAL INFORMATION DISTRIBUTION SYSTEM USING SUCH METHOD, AND STORAGE MEDIUM STORING PROGRAM OF SUCH METHOD

BACKGROUND OF THE INVENTION

1. Field of the Invention

The present invention relates to an electronic watermarking method, a digital information distribution system using such a method, and a storage medium storing a program of such a method. More particularly, the invention relates to electronic watermarking techniques for protecting a copyright of digital information such as moving image data, still image data, voice data, computer data, and computer programs, and to a digital information distribution system using such techniques suitable for use with a multimedia network.

2. Related Background Art

With recent developments of computer networks and widespread use of inexpensive and high performance computers, electronic commerce of selling and buying commodities on networks is prevalent. Commodities sold and bought in electronic commerce may be digital data including images.

However, digital data has a general property that a number of perfect copies of the digital data can be made easily. There is therefore a possibility that a user who bought a commodity of digital data illegally makes copies of the same quality as the original digital data and redistributes them to other users. In this case, a copyright holder of the commodity or an agent (sales agent) entrusted by the copyright holder cannot receive a proper countervalue to be paid for the commodity, and the copyright is infringed.

If the copyright holder or sales agent (hereinafter both are collectively called a server which can legally distribute commodities of digital data) sends a commodity to a buyer once, it is impossible to entirely prevent illegal copies of the commodity. As techniques for effectively protecting copyright instead of directly preventing illegal copies, techniques using a so-called "electronic watermark" have been proposed.

Electronic watermark techniques embed copyright information of digital data and user information of a buyer in original digital data itself by processing the original digital data, to thereby identify the person who illegally copied and redistributed the digital data.

A conventional system using electronic watermark techniques relies upon an assumption that a server is a perfectly trustful facility. If the server is not trustful and performs illegal operations, even a user not making illegal copies in a conventional system may be made chargeable with illegal copies, by the server.

This claim by the server of a conventional electronic watermark system cannot be refuted by users because of the following reason. The server embeds user information in original digital data (in the following, image data is used by way of example) in order to identify the user. Therefore, if the server illegally distributes copies by intentionally embedding information of a particular user, this particular user is judged as illegal.

SUMMARY OF THE INVENTION

It is an object of the present invention to solve the above-described problem and provide reliable prevention of illegal use of digital data as well as reduction of an amount of communication and calculation necessary for such reliable prevention.

According to one aspect of the invention, an electronic watermarking method comprises: a first step of generating a plurality of pieces of information having different electronic watermark information; a second step of generating a plurality of pieces of encrypted information through encryption of each of the plurality of pieces of information with each of a plurality of independent encryption keys; a third step of generating a plurality of encrypted encryption keys through encryption of each independent encryption key with each of the other independent encryption keys; a fourth step of transmitting the plurality of pieces of encrypted information and the plurality of encrypted encryption keys to a user, the first to fourth steps being executed by a server; and a fifth step of selecting, for each piece of information, a pair comprising a piece of the plurality of pieces of encrypted information and a corresponding encrypted encryption key, the fifth step being executed by the user, wherein only some of the encryption keys are multiplied by random numbers.

Another feature of the electronic watermarking method of the invention, is that the server generates an encrypted random number through encryption of a random number, reserves the encrypted random number, and transmits the encrypted random number to the user.

Another feature of the electronic watermarking method of the invention, is that a validity of an electronic watermark is verified.

Another feature of the electronic watermarking method of the invention, is that a validity of an electronic watermark is verified repetitively.

According to another aspect of the invention, an electronic watermarking method is provided in which a validity of electronic watermark information of a user embedded through an electronic watermarking process is guaranteed through an encryption process, wherein the electronic watermark information of the user is inspected.

Another feature of the electronic watermarking method of the invention, is that a signature of the user is verified by using an anonymous public key with a certificate issued by a certification facility.

Another feature of the electronic watermarking method of the invention, is that an image format is used which has a header field storing information to be used for inspecting the encryption process and/or electronic watermark embedding process.

According to another aspect of the invention, a digital information distribution system comprises: first means for generating a plurality of pieces of information having different electronic watermark information; second means for generating a plurality of pieces of encrypted information through encryption of each of the plurality of pieces of information with each of a plurality of independent encryption keys; third means for generating a plurality of encrypted encryption keys through encryption of each independent encryption key with each of the other independent encryption keys; fourth means for transmitting the plurality of pieces of encrypted information and the plurality of encrypted encryption keys to a user, a server being provided with the first to fourth means; fifth means for selecting, for each piece of information, a pair comprising a piece of the plurality of pieces of encrypted information and a corresponding encrypted encryption key, the user being provided with the fifth means; and sixth means for multiplying only some of the encryption keys; by random numbers.

Another feature of the digital information distribution system is that the system further comprises seventh means for generating an encrypted random number through encryption of a random number, reserving the encrypted random number, and transmitting the encrypted random number to the user, the server being provided with the seventh means.

Another feature of the digital information distribution system is that the system further comprises eighth means for verifying a validity of an electronic watermark.

Another feature of the digital information distribution system is that a validity of an electronic watermark is verified repetitively.

According to another aspect of the invention, a digital information distribution system is provided in which a validity of electronic watermark information of a user embedded through an electronic watermarking process is guaranteed through an encryption process, wherein the system comprises inspection means for inspecting the electronic watermark information of the user.

Another feature of the digital information distribution system is that the system further comprises inspection means for inspecting a signature of the user by using an anonymous public key with a certificate issued by a certification facility.

Another feature of the digital information distribution system is that an image format is used which has a header field storing information to be used for inspecting the encryption process and/or electronic watermark embedding process.

According to another aspect of the invention, a storage medium is provided which stores a program for making a computer execute a function of each process of the electronic watermarking method.

According to another aspect of the invention, a storage medium is provided which stores a program for making a computer execute a function of each means of the digital information distribution system.

The embodiments are constituted of the above-described technical means, and only part of encryption keys are multiplied by random numbers. It is therefore possible to prevent processes for encryption keys and random numbers from being reversed. It is therefore possible to prevent a server from making a user use an encryption key intended by the serve.

According another feature of the embodiments, the amount of calculation and communication necessary for embedding an electronic watermark can be reduced as compared to a conventional system and the efficiency of an electronic watermarking method can be improved considerably.

Still other objects of the present invention, and the advantages thereof, will become fully apparent from the following detailed description of the embodiments.

BRIEF DESCRIPTION OF THE DRAWINGS

FIG. 6 is a flow chart illustrating the certifying process of the third embodiment.

DETAILED DESCRIPTION OF THE PREFERRED EMBODIMENTS (First Embodiment)

Figure 1:
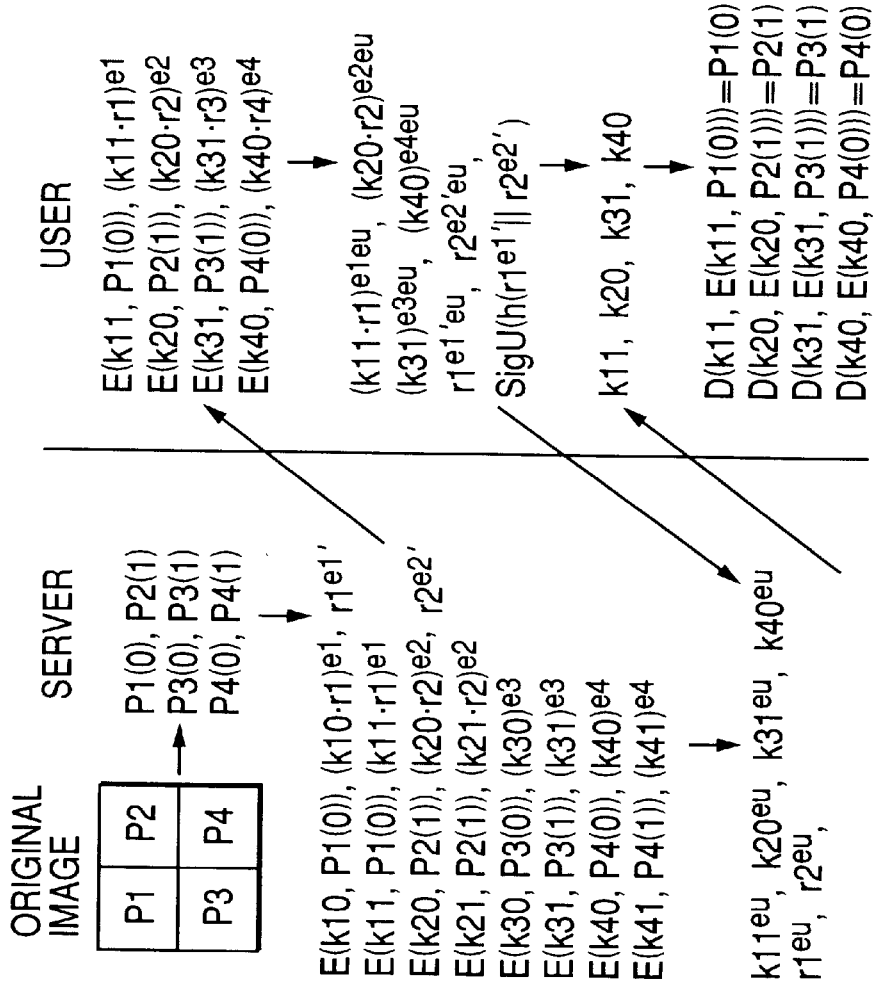
FIG. 1 is a diagram illustrating an embedding process according to a first embodiment of the invention.
Figure 4:
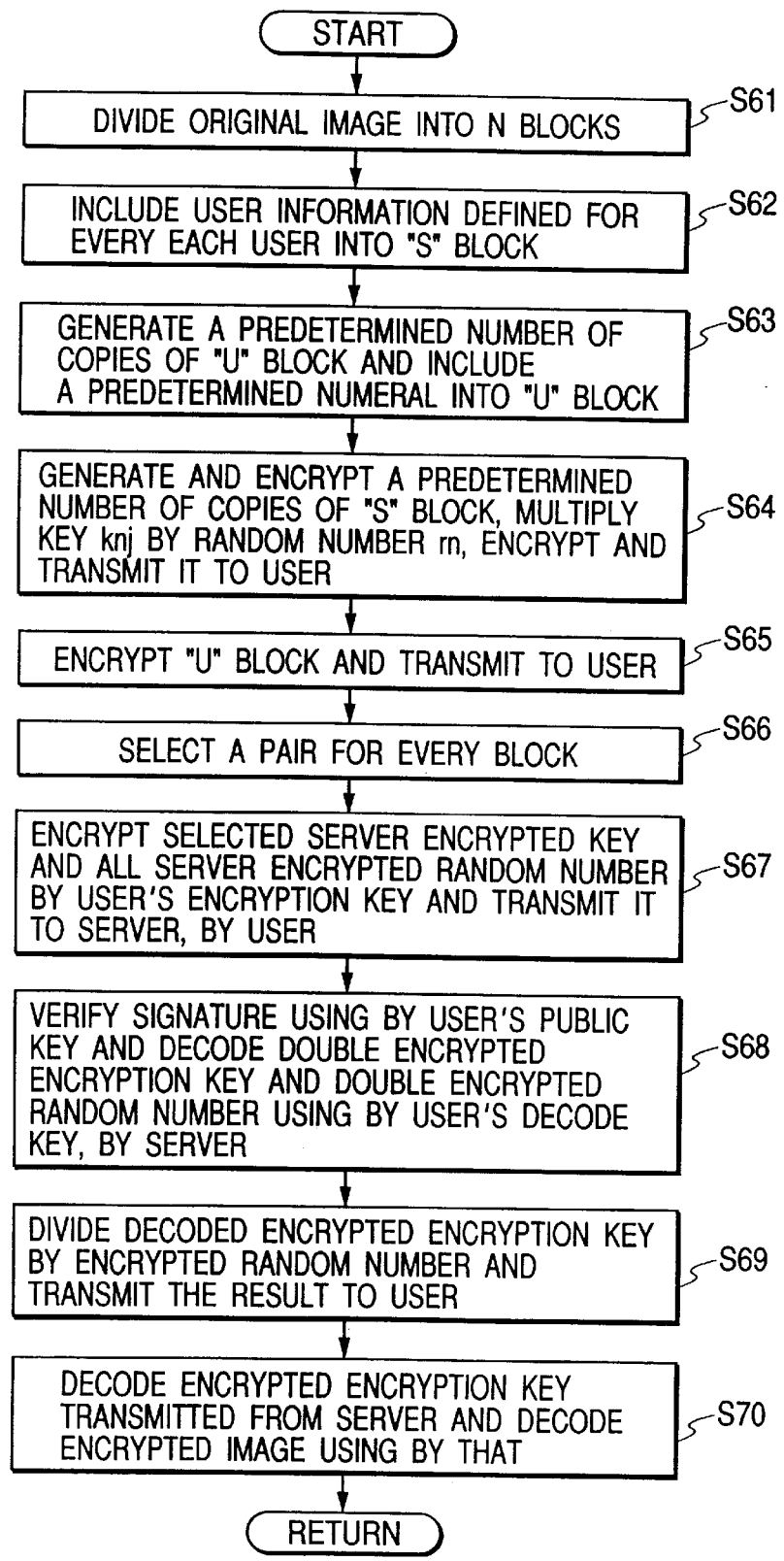
FIG. 4 is a flow chart illustrating the embedding process of the first embodiment.

With reference to FIGS. 1 and 4, a first embodiment of the invention will be described which can prevent the server from making a user use an encryption key intended by the server.

In this embodiment method, random numbers are not used for "U" blocks, but they are used only for "S" blocks so that it is possible to prevent the server from making a user use an encryption key intended by the server. The protocol of this method is as follows.

(Embedding Process)

First, at Step S61 shown in the flow chart of FIG. 4, the server divides the original image into N blocks each being represented by Pn (n=1, . . . , N). The original image is then classified into Ns (Ns<N) "S" blocks and Nu (Nu=N−Ns) "U" blocks.

In the example shown in FIG. 1, the original image is divided into four blocks P1 to P4. The blocks P1 and P2 are assigned to S blocks, and the blocks P3 and P4 are assigned to U blocks. The server prepares an encryption means $E(k, P)$ for encrypting the original image P with an encryption key k (it is assumed that the user has a corresponding decoding means).

The server and user generate independently variables e and d which satisfy $e \cdot d = 1 \mod (p-1)$ where $p = 2q+1$ (q is a prime number). The server generates $(N+N_s)$ pairs of e and d, these pairs being set as (en, dn) (user's e and d being set as (eu, du)). Next, at Step S62, the server embeds user information defined for each user into "S" blocks.

Next, at Step S63, the server generates $2^b$ copies of each "U" block and embeds a numeral "0 to $(2^b-1)$" in each copied block. The block Pn embedded with a numeral i is represented by Pn(i). In the example shown in FIG. 1, assuming that b=1, "S" blocks P1 and P2 are embedded with user information {0, 1}, and numerals 0 and 1 are embedded into two copies of "U" blocks P3 and P4.

Next, at Step S64, the server generates $2^b$ copies of each "S" block Pn(i). The server transmits both E(knj, Pn(i)) obtained through encryption of "S" block Pn(i) with each different encryption key knj (j=0, . . . , $(2^b-1)$) and $(knj \cdot rn)^{en}$ obtained through encryption of the encryption key knj multiplied by a random number rn with the server variable en, to the user.

Also at Step S65, the server transmits both E(kni, Pn(i)) obtained through encryption of "U" block Pn(i) with each different encryption key kni and $(kni)^{en}$ obtained through encryption of the key kni, to the user. The server also reserves $rn_{en}$ obtained through encryption of the "S" block random number rn with en'(n'=N+n), and transmits it to the user. The image encrypted by E(k, P) is hereinafter called an encrypted image, the encryption key encrypted with the server variable en is called a server encrypted encryption key, and the random number encrypted with en' is called a server encrypted random number. The encrypted image, server encrypted encryption key, and server encrypted random number can be transmitted randomly if a correspondence therebetween is correct.

Next, at Step S66, the user selects one pair per each block of encrypted image and server encrypted encryption key, from a plurality of encrypted images and server encrypted encryption keys transmitted from the server. In the example shown in FIG. 1, the user selects for the four blocks a pair of E(k11, P1(0)) and $(k11 \cdot r1)^{e1}$, a pair of E(k20, P2(1)) and $(k20 \cdot r2)^{e2}$, a pair of $E(k31, P3(1))$ and $(k31)^{e3}$, and a pair of $E(k40, P4(0))$ and $(k40)^{e4}$.

Next, at Step S67, the user encrypts the selected server encrypted encryption keys and all the server encrypted random numbers with the user's encryption key eu, and transmits them to the server as double encrypted encryption keys and double encrypted random numbers. At this time, the user also transmits to the server a hash number of a set of all server encrypted random numbers combined, the hash number being given a signature of the user in accordance with the public key cyptosystem. In the example shown in FIG. 1, this is represented by $SigU(h(r1^{e1'}\|r2^{e2'}))$.

Next, at Step S68, the server verifies the signature by using the user public key, and thereafter decodes the supplied double encrypted encryption keys and double encrypted random numbers. Namely, the data encrypted with en is raised to the power of dn and the result is subjected to modulo arithmetic.

Next, at Step S69, the server divides the decoded encrypted encryption key (user encrypted encryption key) by the decoded encrypted random number (user encrypted random number) and transmits the result to the user. At this time, the server stores the decoded "S" and "U" block user encrypted random numbers and the supplied signature.

In the example shown in FIG. 1, "$k11^{eu}$, $k20^{eu}$, $k31^{eu}$, $k40^{eu}$" are transmitted to the user, and "$r1^{eu}$, $r2^{eu}$, $k31^{eu}$, $k40^{eu}$" and $SigU(h(r1^{e1'}\|r2^{e2'}\|r3^{e3'}\|r4^{e4'}))$ are reserved in the server.

Next, at Step S70, the user decodes the supplied user encrypted encryption keys, and decodes the encrypted image by using the decoded encryption keys to combine the divided blocks and form an electronic watermark image. In the example shown in FIG. 1, the supplied encrypted encryption keys are decoded by raising it to a power of du and subjecting the result to modulo arithmetic to thereby obtain encryption keys k11, k20, k31, and k40.

These keys are the same as those used for the encrypted images selected at Step S66. Therefore, by decoding the images by using these keys, it is possible to obtain P1(0), P2(1), P3(1), and P4(0).

By combining the blocks, an electronic watermark image can be obtained which has the user information {0, 1} in the "S" blocks and the user selected {1, 0} pattern in the "U" blocks.

It is obvious that the certifying process corresponding to the above protocol can be realized through processes similar to those described above, by changing the signature supplied to a certifier from $SigU(h(r1^{e1'}\|r2^{e2'}\|r3^{e3'}\|r4^{e4'}))$ to $SigU(h(r1^{e1'}\|r2^{e2'}))$ and the server encrypted random numbers from "$r1^{e1'}$, $r2^{e2'}$, $r3^{e3'}$, $r4^{e4'}$" to "$r1^{e1'}$, $r2^{e2'}$".

As above, the processes for encryption keys and random numbers can be prevented from being reversed and the server cannot make the user use an encryption key intended by the server. Furthermore, the calculation and communication amount necessary for a process of embedding an electronic watermark can be reduced more than a conventional process so that the efficiency of executing a watermarking process can be considerably improved.

If the reduction of the calculation and communication amount and the simplification of processes are more important than security, the process for all random numbers may be omitted. In this case, at Step S64, it is not necessary to generate copies of the "S" blocks 54, but only $E(kn, Pn(i))$ through encryption with one encryption key kn and $(kn)^{en}$ are generated, and thereafter all the processes for random numbers rn can be omitted.

(Second Embodiment)

Next, with reference to FIGS. 2 and 5, a second embodiment will be described which can further improve security of the system.

In this embodiment method, high security can be realized by repeating a certifying operation without depending upon the number N of image divisions and the number Nu of "U" blocks. A specific certifying operation is as in the following.

(Certifying Process)

Figure 5:
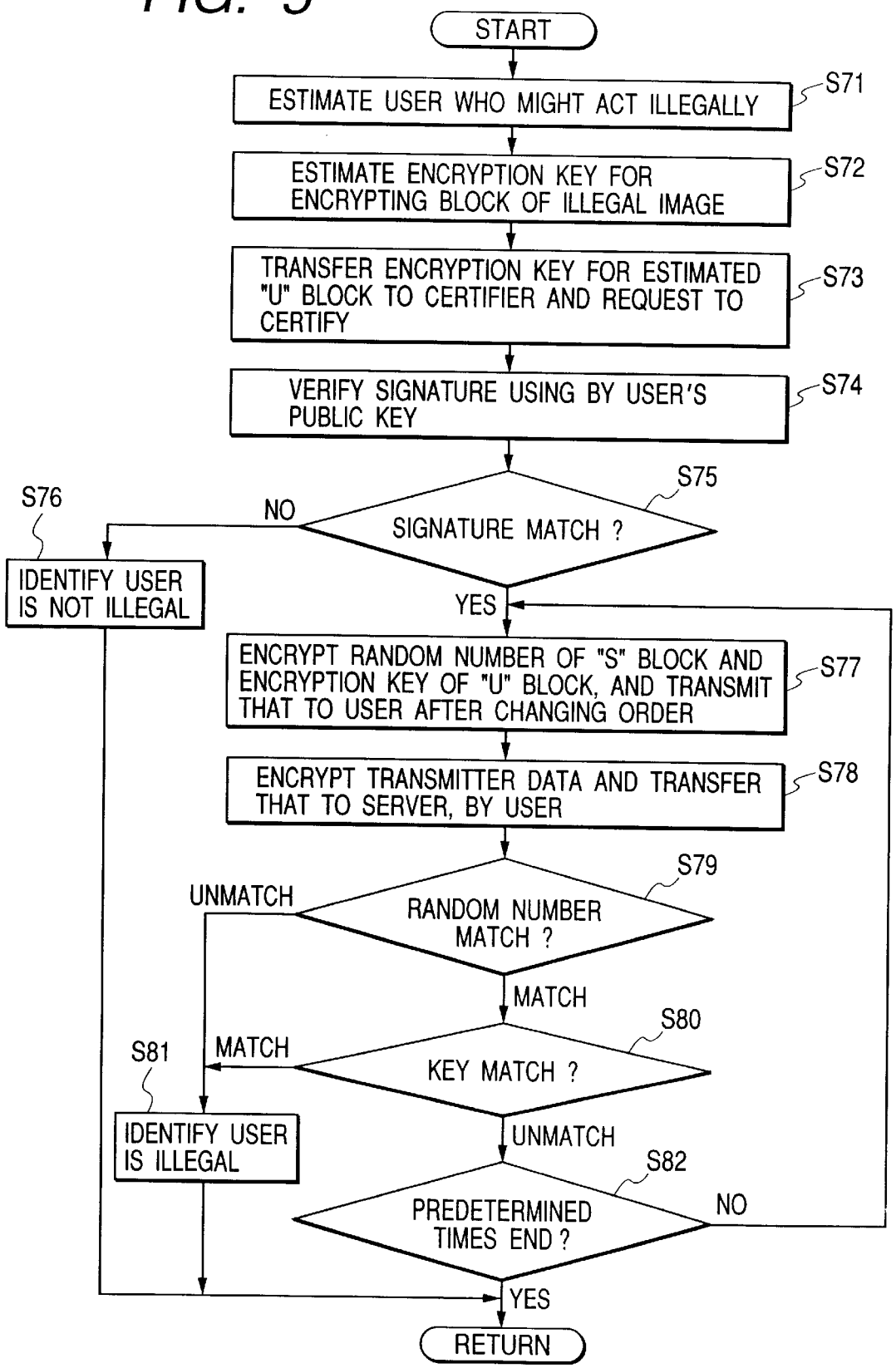
FIG. 5 is a flow chart illustrating the certifying process of the second embodiment.

As illustrated in the flow chart of FIG. 5, at Step S71 the server derives user information from "S" blocks of an illegal image, and estimates a user who might act illegally.

Next, at Step S72, the server estimates each "U" block the user selected, in accordance with the illegal image, and estimates the encryption key used for encrypting each block.

Next, at Step S73, the server requests the certifier to perform certification by sending to the certifier an estimated user name, the reserved "S" and "U" user encrypted random numbers, signature, and all server encrypted random numbers and "S" block random numbers respectively reserved at Step S65 of the embedding process, and the estimated "U" block encryption keys.

Figure 2:
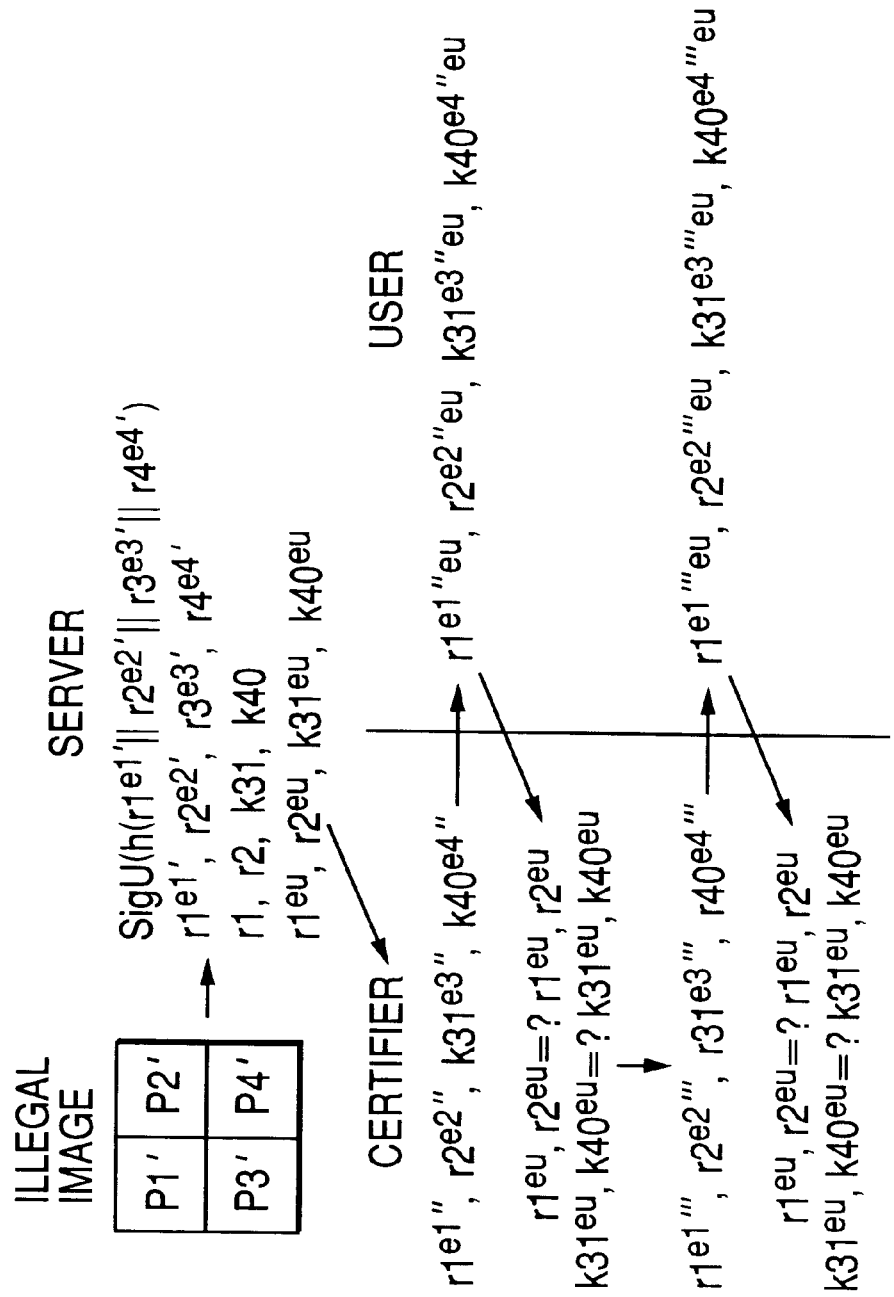
FIG. 2 is a diagram illustrating a certifying process according to a second embodiment of the invention.

In the example shown in FIG. 2, the server transmits to the certifier "$r1^{eu}$, $r2^{eu}$, $k31^{eu}$, $k40^{eu}$, $SigU(h(r1^{e1'}\|r2^{e2'}\|r3^{e3'}\|r4^{e4'}))$, $r1^{e1'}$, $r2^{e2'}$, $r3^{e3'}$, $r4^{e4'}$, r1, r2, k31, k40$" in addition to the user name.

At Step S74, the certifier generates the hash value by using the server encrypted random numbers reserved at Step S64 of the embedding process, and verifies the signature by using the user public key as to whether the signature matches.

At Step S75 it is judged from the verification result whether the signature matches. If not, the server encrypted random numbers are not used for the embedding process for that user, and the flow advances to Step S76 to judge that the user does not act illegally.

On the other hand, if the verification result at Step S75 indicates that the signature matches, the flow advances to Step S77 whereat the certifier generates N pairs of variables for the image data P used by the embedding process, encrypts the "S" block random numbers and "U" block encryption keys with the variables, and transmits them by changing the order.

In the example shown in FIG. 2, four pairs of variables (e1", d1") to (e4" to d4") are generated, and the "S" block random numbers r1 and r2 and "U" block encryption keys k31 and k40 are encrypted into "$r1^{e1"}$, $r2^{e2"}$, $k31^{e3"}$, $k40^{e3"}$".

Next, at Step S78, the user encrypts the supplied data with the encryption key eu used for the embedding process and transmits the result to the server. In the example shown in FIG. 2, "$r1^{e1"eu}$, $r2^{e2"eu}$, $k31^{e3"eu}$, $k40^{e3"eu}$" are transmitted to the server. In this case, since the order of the "S" block random numbers r1 and r2 and "U" block encryption keys k31 and k40 is changed, the user cannot discriminate between the blocks including the "S" and "U" blocks.

Next, at Step S79, the server performs a comparison process for random numbers and encryption keys. Specifically, the server decodes the supplied data, i.e., by raising the data to a power of di" and subjecting the result to modulo arithmetic. The decoded results are compared with the reserved "S" block user encrypted random numbers and "U" block user encrypted encryption keys.

If this comparison result indicates that the "S" block user encrypted random numbers do not match, it means that the user used an encryption key different from that used for the embedding process, so that the flow skips from Step S79 to S81 whereat it is judged that the user acted illegally.

On the other hand, if the "S" block user encrypted random numbers match and the "U" block user encrypted encryption keys do not match, it is not judged that the user acted illegally. If the "U" block user encrypted encryption keys match although the "S" block user encrypted random numbers match, it is judged that the user acted illegally. In the example shown in FIG. 2, the "S" block user encrypted random numbers "$r1^{eu}$, $r2^{eu}$" and the "U" block user encrypted encryption keys "$k31^{eu}$, $k40^{eu}$" are used for the comparison process. If the "S" block user encrypted random numbers match and the "U" block user encrypted encryption keys do not match, the flow advance to Step S82 whereat it is checked whether a predetermined number of certifying processes is completed.

If the predetermined number of certifying processes was completed or if the server admits to terminate the certifying process, then this process is terminated. In this case, an illegal act by the user cannot be identified. In other cases, the certifying process is repeated.

In the above certifying process, a probability that an illegally acting user can encrypt one block with a different encryption key, is Nu/N (at this probability the certifier cannot judge the illegal user as illegal).

If Steps S87 to 82 of the certifying process are repeated k times, the illegally acting user is required to encrypt each time the same block with a different encryption key. However, since the order of data supplied from the server at Step S77 is changed each time, the user cannot discriminate the block which previously encrypted with a different encryption key, from other "U" blocks.

Therefore, with the embodiment certifying process, the illegally acting user succeeds only at a probability of $(Nu/N)^k$. If the value k is made large, security of the certifying process can be improved without depending on the number of image divisions.

If the embodiment certifying process is applied to the first embodiment embedding process, the certifying process of high security can be realized through processes similar to those described above, by changing the signature supplied to the certifier from $SigUj(h(r1^{e1"}\|r2^{e2"}\|r3^{e3"}\|r4^{e4"}))$ to $SigU(h(r1^{e1'}\|r2^{e2'}))$ and the server encrypted random numbers from "$r1^{e1'}$, $r2^{e2"}$, $r3^{e3'}$, $r4^{e4"}$" to "$r1^{e1'}$, $r2^{e2"}$".

(Third Embodiment)

Next, with reference to FIGS. 3 and 6, a third embodiment will be described which can further improve security of the system. In this embodiment method, the image is inspected directly to reduce a load on the certifying process, without using an encryption approach as in the certifying process of the second embodiment.

A specific certifying operation is as in the following. It is assumed in the third embodiment that the server acquires, prior to this certifying process, contract information on image purchase from the user, and that the certifier knows a method of deriving electronic watermark information from the image.

(Certifying Process)

As illustrated in the flow chart of FIG. 6, at Step S71 the server derives user information from "S" blocks of an illegal image, and estimates a user who might act illegally.

Next, at Step S82, in accordance with the illegal image of the estimated user, the server estimates each "U" block the user selected and a numeral embedded in each block.

Next, at Step S83, the server supplies the certifier with the estimated user name, contract information of the user, numeral embedded in each "S" block, and numeral embedded in each "U" block, and requests the certifier to perform certification.

Figure 3:
FIG. 3 is a diagram illustrating a certifying process according to a third embodiment of the invention.

In the example shown in FIG. 3, therefore, the server supplies the certifier with the user name as well as the contract information of the user and the numerals (0, 1, 1, 0). The contract information is represented by SigU(C) where C is a purchase order document from a user with the user name being identified, and SigU( ) indicates that the user gave a signature.

Next, at Step S84, the certifier checks the contract information. The certifier makes the user submit the image purchased by the user (refer to FIG. 3). At the next Step S86 each extracted numeral of each block is compared with a corresponding numeral supplied from the server, to check there is a coincidence therebetween.

If this comparison result shows that the numeral extracted from the user image coincides with the numeral supplied from the server, the user is judged as illegal. If there is no coincidence, the user is judged as not illegal.

This embodiment is obviously applicable to a conventional embedding method, and first and second embodiments. It is also obvious that if this embodiment certifying process is used, a process of reserving of server encrypted random numbers and encryption keys during the embedding process and a process of giving a signature to the hash value of user encrypted random numbers can be omitted.

Furthermore, since the certification facility can derive electronic watermark information, this facility is required to be trustful and know a secret key used for deriving the electronic watermark information. This facility may be used therefore as a key management facility in a key deposit system or a key recovery system.

(Other Embodiments)

Watermark information can be embedded by a well-known embedding method. Examples of an electronic water mark embedding method include: a method using discrete cosine transform such as a NTT method ("Electronic Watermarking Method under Frequency Domain for Copyright Protection of Digital Image" by Nakagawa, Ogawa, Takahashi, SICI-97-26A, January 1997); a method using discrete Fourier transform such as a National Defense Academy method ("Watermark Signature Method to Image through PN Series", by Ohnishe, Oka, Matsui, SCIS-9726B, January 1997); a method using wavelet transform such as a Mitsubishi, Kyushu University method ("Experimental Studies on Security and Reliability of Electronic Watermark Technology using Wavelet Transform", by Ishizuka, Sakai, Sakurai, SCIS, January 1997); and the like.

An encryption process E(k, P) can be realized by various encryption methods. For example, it can be realized easily by common key cryptosystems such as DES and FEAL.

Image division in the above embodiments includes not only two-dimensional division such as illustrated in FIGS. 1 to 3, but also bit plane division at each level of multi-value image, color division at each color such as RGB, and division of images which forms the original image embedded with an electron water mark when they are synthesized. An original image is not limited only to a still image but it includes all digital information such as moving images and voices.

In the above embodiments, the server checks an illegal image. An illegal image may be checked not only by the server but also by a specific inspection facility or a third party which knows an electronic watermark deriving method.

The encrypted image, server encrypted encryption key, server encrypted random number and the like may be widely distributed from the server by using a network, CD-ROM, and the like. The server encrypted encryption keys and server encrypted random numbers for encrypted images may be given a server signature to ensure their correspondence.

In some cases, contract information of a user requesting image data is supplied to the server prior to the embedding process. In this case, the contract information may be given a user signature by using the public key cryptosystem.

In some cases, the public key used for inspecting the user signature is guaranteed by a certification facility. In this case, if a relation between the public key and the user is kept in secret by the certification facility, anonymity of the user can be established.

It is also possible to apply the embodiments to a system which has an agent for image sales between a server and a user. In this case, the server and agent may take partial charge of generating server encrypted random numbers and encryption keys during the embedding process.

(Fourth Embodiment)

Server or user encrypted encryption keys and random numbers of the above embodiments may be stored in an arbitrary image format. With a general image format, in particular, supplied electronic watermark image data or encrypted image data can be stored in the image data field, whereas various information including server or user encrypted encryption keys, random numbers and the like relative to electron watermark can be stored in the header field.

Such server or user encrypted encryption keys, random numbers and the like in the general image format may be stored hierarchically or may be stored in a property set as attribute information.

In a file format which stores image data at each hierarchical level at each resolution, the image attribute information stored in the image header field and image data are stored in the file at a further hierarchically structured level. Each property and data in the hierarchically structured image file are accessed by a storage and a stream which correspond to a directory and a file of MS-DOS. The image data and image attribute information are stored in the stream field.

Image data is hierarchically stored in accordance with a resolution. Images having different resolutions are called subimages having resolutions 0, 1, . . . , n. Information necessary for reading image data at each resolution is stored in a subimage header field and the image data is stored in a subimage data field.

Property sets are image attribute information classified and defined in accordance with the use purpose and contents. The property sets include a summary information property set, an image information property set, an image content property set, an extension list property set, and other property sets.

The summary information property set is not specific to FlashPix, but is essential for the structured storage of Microsoft Corporation. This property set stores a title, an author, a thumbnail image, and the like of the image file.

The image content property set is an attribute which describes a storage method for image data. For example, the image content property set describes the number of hierarchical levels of image data, the width and height of an image having a highest resolution, the width, height, and color compositions of an image at each resolution, a definition of a quantization table/Huffman table to be used for JPEG compression, and the like.

The image information property set stores various information capable of being used when an image is used, the information including such as information on how the image is fetched and information on how the image can be used.

The extension list property set is a field to be used when the following information (a) to (i) not contained in the fundamental specification of FlashPix is added.

(a) Information on how digital data is fetched or generated.

(b) Information on copyright (Intellectual property).

(c) Information on the image contents (person, location, and the like in an image) (Content description).

(d) Information on a camera used for image pickup (Camera information).

(e) Information on settings (exposure, shutter speed, focal length, presence/absence of a flash) of a camera used for image pickup (Per Picture camera settings).

(f) Information on a resolution and mosaic filter specific to a digital camera (Digital camera characterization).

(g) Information on a manufacture name, product name, type (negative/positive, color/white-black), and the like of a film (Film description).

(h) Information on a type and size of an original if it is a book or printed matter (Original document scan description).

(i) Information on a user and scanner software if an image was scanned (Scan device).

In this file format, there is an image file for storing in common both image data and viewing parameters used when the image is displayed.

The viewing parameters are a set of processing coefficients used when an image is displayed in a matched state, the processing including image rotation, magnification/reduction, transfer, color conversion, and filtering.

Source/result FlashPix image objects are an entity of image data.

Source/result desc. property sets are property sets for discriminating between images, and store an image ID, a change prohibited property set, a final update date and time, and the like.

A transform property set 1306 stores Affine conversion coefficients for image rotation, magnification/reduction, and transfer, a color conversion matrix, contrast adjustment values, and filtering coefficients.

The hash value, certification facility, public key cryptosystem, common key cryptosystem in the above embodiments will be described in summary.

The hash value is an output value of a hash function h. The hash function is a compression function hard to be subject to collision. The collision means $h(x1)=h(x2)$ for different $x1$ and $x2$.

The compression function is a function of converting a bit train having an arbitrary bit length into a bit train having a certain bit length. Therefore, the hash function is a function for converting a bit train having an arbitrary bit length into a bit train having a certain bit length, which function cannot find with ease $x1$ and $x2$ satisfying $h(x1)=h(x2)$.

Since x which satisfies $y=h(x)$ cannot be found with ease from an arbitrary y, the hash function is essentially a one way function. Known examples of the hash function are MD (Message Digest) 5, SHA (Secure Hash Algorithm), and the like.

(Certification Facility)

A facility which issues a certificate for a user public key in order to guarantee the validity of the user public key of the public key cryptosystem, is called a certification facility. Specifically, a certificate is issued by giving a signature to a user public key or data regarding the user, by using a secret key of the certification facility.

For example, a user received a public key with a certificate from another user, inspects the certificate by using the public key of the certification facility to thereby certify the validity of the user (certify at least that the user was entrusted by the certification facility) supplied the public key.

(Public Key Cryptosystem)

The public key cryptosystem uses different ciphering key and deciphering key, the former being made in public and the latter being kept in secret.

Typical examples of this system is an RSA cryptosystem, an ElGamal cryptosystem and the like. This system has the following characteristics (1) to (3) and can realize secret communications, verification communications, and the like.

(1) Since the enciphering key and deciphering key are different and the enciphering key can be made public, the enciphering key is not required to be kept in secret so that a delivery of the enciphering key becomes easy.

(2) Since the enciphering key of each user is made public, each user is required to keep in secret only the deciphering key.

(3) It is possible to realize a verification function that a receiver can confirm whether a transmitter transmitted a communication text is a false person and whether the communication text is not altered.

(Key Deposit System or Key Recovery System)

A key deposit system or key recovery system is a system in which an enciphering key is deposited to a trustful third party and if any criminal occurs or the key is lost, the key can be supplied from the third party.

(Other embodiments)

The invention may be embodied in a system constituted of a plurality of apparatuses (e.g., a host computer, interface device, reader, printer and the like) or in a single apparatus.

The scope of the invention also includes a system or apparatus whose computer (CPU or MPU) runs to operate various devices connected thereto in accordance with software program codes supplied to the system or apparatus so as to realize the functions of the above embodiments.

In this case, the software program codes themselves realize the embodiment functions. Therefore, the program codes themselves and means for supplying such program codes to a computer, e.g., a storage medium storing such program codes, constitute the present invention. The storage medium storing such program codes may be a floppy disk, a hard disk, an optical disk, a magneto-optical disk, a CD-ROM, a magnetic tape, a non-volatile memory card, a ROM, and a like.

Obviously, such program codes are other types of embodiments of this invention, not only for the case wherein the embodiment functions are realized by executing the program codes supplied to the computer but also for the case wherein the embodiment functions are realized by the program codes used with an OS (operating system) on which the computer runs or with other various types of application software.

Furthermore, the scope of the invention also includes obviously the case wherein in accordance with the program codes stored in a memory of a function expansion board or unit connected to the computer supplied with the program codes, a CPU or the like of the function board or unit executes part or the whole of the actual tasks for realizing the embodiment functions.

As apparent from the foregoing description of the embodiments, only part of encryption keys are multiplied by random numbers. It is therefore possible to prevent processes for encryption keys and random numbers from being reversed. It is therefore possible to prevent a server from making a user use an encryption key intended by the serve, so that the server can be prevented from intentionally embedding user information and illegally distributing copies of original information.

Furthermore, according to another feature of the embodiments, the calculation and communication amount necessary for embedding an electronic watermark can be reduced as compared to a conventional system and the efficiency of an electronic watermarking method can be improved considerably. A high security and efficiency system can be realized which can prevent illegal distribution of digital data.

What is claimed is:

1. An information processing method comprising:

a first step of dividing digital data into a plurality of pieces and generating a plurality of pieces of encrypted digital data by encrypting each of the plurality of pieces of digital data using each respective one of a provider's encryption keys;

a second step of generating a first set of encrypted provider encryption keys by multiplying at least one of the provider's encryption keys by a random number and encrypting the result;

a third step of generating a second set of encrypted provider encryption keys by encrypting at least one of the provider's encryption keys, the first to third steps being executed by a provider apparatus;

a fourth step of selecting at least one pair comprising a member of the second set of encrypted provider encryption key and a corresponding a piece of encrypted digital data; and a fifth step of generating a first set of double encrypted encryption keys by respectively encrypting each member of the first set of encrypted provider encryption keys and a second set of double encrypted encryption keys by respectively encrypting each member of the second set of encrypted provider encryption keys selected in the fourth step, the fourth and fifth steps being executed by a user apparatus, wherein the first set of double encrypted provider encryption keys and the second set of double encrypted provider encryption keys are decrypted and used to generate a third encrypted encryption key and a fourth encrypted encryption key by said provider apparatus.

2. An information processing method according to claim 1, further comprising:

a sixth step of giving a digital signature on the basis of an encrypted random number to the first set of double encrypted encryption keys and the second set of double encrypted encryption keys, the sixth step being executed by said user apparatus.

3. An information processing method according to claim 2, further comprising:

a seventh step of verifying the digital signature by using an anonymous public key with a certificate issued by a certification facility, the seventh step being executed by said provider apparatus, wherein the sixth step is executed in accordance with a public key cryptosystem.

4. An information processing method according to claim 2, further comprising:

a step of adding electronic watermark information to each the plurality of pieces of encrypted digital data, this step being executed by said provider apparatus.

5. An information processing method according to claim 1, wherein the fourth step comprises selecting at least one pair comprising a member of the first set of encrypted provider encryption keys and a corresponding piece of
encrypted digital data, and wherein the fifth step comprises generating the first set of double
encrypted encryption keys by respectively encrypting
each member of the first set of encrypted provider
encryption keys selected in the fourth step.

6. An information processing method comprising a plurality of steps being executed by a provider apparatus, said method comprising the steps of:

dividing digital data into a plurality of pieces and generating a plurality of pieces of encrypted digital data by encrypting each of the plurality of pieces of digital data using each respective one of a provider's encryption keys;

generating a first set of encrypted provider encryption keys by multiplying at least one of the provider's encryption keys by a random number and encrypting the result;

generating a second set of encrypted provider encryption keys by encrypting at least one of the provider's encryption keys; and generating a third encrypted encryption key and a fourth encrypted encryption key on the basis of a first double encrypted encryption key and a second double encrypted encryption key; respectively, wherein the first double encrypted encryption key and the second double encrypted encryption key are respectively generated by encrypting a member of the first set of encrypted provider encryption keys and a member of the second set of encrypted provider encryption keys with a user's encryption key.

7. A computer-readable program comprising program code for an information processing method comprising a plurality of steps being executed by a provider apparatus, said steps of:

dividing digital data into a plurality of pieces and generating a plurality of pieces of encrypted digital data by encrypting each of the plurality of pieces of digital data using each respective one of the provider's encryption keys;

generating a first set of encrypted provider encryption keys by multiplying at least one of the provider's encryption keys by a random number and encrypting the result;

generating a second set of encrypted provider encryption keys by encrypting at least one of the provider's encryption keys; and generating a third encrypted encryption key and a fourth encrypted encryption key respectively on the basis of a first double encrypted encryption key and a second double encrypted encryption key;

wherein the first double encrypted encryption key and the second double encrypted encryption key are respectively generated by encrypting a member of the first set of encrypted provider encryption keys and a member of the second set of encrypted provider encryption keys with a user's encryption key.

8. A computer-readable medium containing program code for an information processing method comprising a plurality of steps being executed by a provider apparatus, said steps of:

dividing digital data into a plurality of pieces and generating a plurality of pieces of encrypted digital data by encrypting each of the plurality of pieces of digital data using each respective one of the provider's encryption keys;

generating a first set of encrypted provider encryption keys by multiplying at least one of the provider s encryption keys by a random number and encrypting the result;

generating a second set of encrypted provider encryption keys by encrypting at least one of the provider's encryption keys; and generating a third encrypted encryption key and a fourth encrypted encryption key respectively on the basis of a first double encrypted encryption key and a second double encrypted encryption key, wherein the first double encrypted encryption key and the second double encrypted encryption key are respectively generated by encrypting a member of the first set of encrypted provider encryption keys and a member of the second set of encrypted provider encryption keys with a user's encryption key.

9. An information processing method comprising a plurality of steps being executed by a user apparatus, said method comprising the steps of:

receiving a first encrypted provider encryption key and a second encrypted provider encryption key from a provider apparatus, wherein the first encrypted provider encryption key is generated by multiplying a server's encryption key by a random number and encrypting the result, and the second encrypted provider encryption key is generated by encrypting the server's encryption key;

selecting at least one pair comprising a second encrypted provider encryption key and a corresponding piece of encrypted digital data; and generating a first double encrypted encryption key and a second double encrypted encryption key by respectively encrypting the first encrypted provider encryption key and the second encrypted provider encryption key selected in selecting step.

10. A computer-readable program comprising program codes for an information processing method comprising a plurality of steps being executed by a user apparatus, said method comprising the steps of:

receiving a first encrypted provider encryption key and a second encrypted provider encryption key from a provider apparatus, wherein the first encrypted provider encryption key is generated by multiplying a server's encryption key by a random number and encrypting the result, and the second encrypted provider encryption key is generated by encrypting the server's encryption key;

selecting at least one pair comprising a second encrypted provider encryption key and a corresponding piece of encrypted digital data; and generating a first double encrypted encryption key and a second double encrypted encryption key by respectively encrypting the first encrypted provider encryption key and the second encrypted provider encryption key selected in selecting step.

11. A computer-readable medium containing program codes for an information processing method comprising a plurality of steps being executed by a user apparatus, said steps of:

receiving first encrypted provider s encryption key and second server s encryption key from a provider apparatus, wherein said first encrypted provider s encryption key is generated by encrypting a result of multiplying server s encryption key by random number, and said second server s encryption key is generated by encrypting said server encryption key;

selecting at least a pair of a second encrypted provider s encryption key and a corresponding a piece of encrypted digital data; and generating first double encrypted encryption keys and second double encrypted encryption keys through encrypting respectively first encrypted provider s encryption key and second encrypted provider s encryption key selected in selecting step.

* * * * *

UNITED STATES PATENT AND TRADEMARK OFFICE
CERTIFICATE OF CORRECTION

PATENT NO. : 6,560,339 B1
DATED : May 6, 2003
INVENTOR(S) : Keiichi Iwamura

It is certified that error appears in the above-identified patent and that said Letters Patent is hereby corrected as shown below:

Title page,
Illustrative figure, "EVERY EACH" should read -- EACH -- in block S62; and "USING BY" all three occurrences, in blocks S68 (twice) and S70 should read -- BY USING --.

Drawings,
Sheet 4, Figure 4, "EVERY EACH" should read -- EACH -- in block S62; and "USING BY" all three occurrences, in blocks S68 (twice) and S70 should read -- BY USING --.

Column 1,
Line 52, "trustful" should read -- trustworthy --.

Column 3,
Line 44, "serve." should read -- server. --.

Column 5,
Lines 25 and 26, "$k40^{eu"}$" should read -- $k40^{eu"}$ --.

Column 7,
Line 40, "$SigUj(h(ri^{e1'\|r2e2"}\|r3^{e3'}\|r4^{e4"}))$" should read -- $SigUj(h(ri^{e1'}\|r2^{e2"}\|r3^{e3'}\|r4^{e4"}))$ --.

Column 11,
Line 46, "a," should read -- the --; and
Line 66, "serve," should read -- server, --.

Column 12,
Line 61, "each" should read -- each of --.

Column 14,
Line 65, "provider s" should read -- provider's --;
Line 66, "server s" should read -- server's --; and
Line 67, "provider s" should read -- provider's --.

Column 15,
Lines 2 and 3, "server s" should read -- server's --;
Line 4, "server" should read -- server's --; and
Line 5, "provider s" should read -- provider's --.

UNITED STATES PATENT AND TRADEMARK OFFICE
CERTIFICATE OF CORRECTION

PATENT NO. : 6,560,339 B1
DATED : May 6, 2003
INVENTOR(S) : Keiichi Iwamura

It is certified that error appears in the above-identified patent and that said Letters Patent is hereby corrected as shown below:

Column 16,
Lines 3 and 4, "provider s" should read -- provider's --.

Signed and Sealed this

Twenty-seventh Day of January, 2004

JON W. DUDAS
*Acting Director of the United States Patent and Trademark Office*